(12) United States Patent
Kim et al.

(10) Patent No.: US 11,201,761 B2
(45) Date of Patent: Dec. 14, 2021

(54) METHOD AND TERMINAL FOR ACQUIRING INFORMATION ON SERVICE FUNCTION CHAIN IN NEXT-GENERATION MOBILE COMMUNICATION NETWORK

(71) Applicant: LG ELECTRONICS INC., Seoul (KR)

(72) Inventors: Hyunsook Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 740 days.

(21) Appl. No.: 16/076,296

(22) PCT Filed: Nov. 9, 2016

(86) PCT No.: PCT/KR2016/012866
§ 371 (c)(1),
(2) Date: Aug. 7, 2018

(87) PCT Pub. No.: WO2017/138688
PCT Pub. Date: Aug. 17, 2017

(65) Prior Publication Data
US 2021/0194730 A1     Jun. 24, 2021

Related U.S. Application Data

(60) Provisional application No. 62/293,779, filed on Feb. 11, 2016.

(51) Int. Cl.
*H04L 12/46* (2006.01)
*H04L 12/24* (2006.01)
(52) U.S. Cl.
CPC .......... *H04L 12/4641* (2013.01); *H04L 41/50* (2013.01)

(58) Field of Classification Search
CPC ......... H04L 45/00; H04L 45/02; H04L 45/04; H04L 67/00; H04L 67/02; H04L 41/12;
(Continued)

(56) References Cited

U.S. PATENT DOCUMENTS

2002/0156814 A1* 10/2002 Ho .......................... G06F 9/541
715/205
2015/0215172 A1* 7/2015 Kumar ................... H04L 43/026
709/223
(Continued)

FOREIGN PATENT DOCUMENTS

KR     1020150019443     2/2015
WO     2015152436        10/2015

OTHER PUBLICATIONS

PCT International Application No. PCT/KR2016/012866, International Search Report dated Feb. 1, 2017, 4 pages.
(Continued)

*Primary Examiner* — Robert B Harrell
(74) *Attorney, Agent, or Firm* — Lee Hong Degerman Kang Waimey

(57) ABSTRACT

Disclosed in the present specification is a method by which a terminal acquires service function chain (SFC) information. The method comprises the steps of: transferring, to a controller, the terminal state information and/or the terminal configuration information; and receiving the SFC information, determined by the controller, by considering the terminal state information and/or the terminal configuration information, wherein the SFC information includes logical path information of a virtualized network function (VNF). The method can also include a step for receiving sub-chain information, determined by the controller, on the basis of the SFC information, or determining the sub-chain information on the basis of the SFC information.

12 Claims, 15 Drawing Sheets

(58) Field of Classification Search
CPC ..... H04L 41/50; H04L 12/4641; H04L 12/46; H04L 12/24; H04W 84/18; G06F 13/00
USPC ........................................................ 370/254
See application file for complete search history.

(56) References Cited

U.S. PATENT DOCUMENTS

| | | | |
|---|---|---|---|
| 2016/0094667 A1* | 3/2016 | Jani ................. | H04L 67/16 709/202 |
| 2017/0250903 A1* | 8/2017 | Rasanen ............ | H04L 45/306 |
| 2019/0081894 A1* | 3/2019 | Yousaf ............... | H04L 45/38 |

OTHER PUBLICATIONS

Halpern, J. et al., "Service Function Chaining (SFC) Architecture", Internet Engineering Task Force (IETF), SFC WG, RFC 7665, Oct. 2015, 34 pages.

Choi, Nak Jung et al., "Introduction and Evolution of Network Function Virtualization/ Software Defined Networking-based Virtual EPC", KNOM Review, vol. 17, No. 2, pp. 34-46, Dec. 2014, 16 pages.

\* cited by examiner

METHOD AND TERMINAL FOR ACQUIRING INFORMATION ON SERVICE FUNCTION CHAIN IN NEXT-GENERATION MOBILE COMMUNICATION NETWORK

CROSS-REFERENCE TO RELATED APPLICATIONS

This application is the National Stage filing under 35 U.S.C. 371 of International Application No. PCT/KR2016/012866, filed on Nov. 9, 2016, which claims the benefit of U.S. Provisional Application No. 62/293,779, filed on Feb. 11, 2016, the contents of which are all hereby incorporated by reference herein in its entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that |

TABLE 1-continued

| REFERENCE POINT | DESCRIPTION |
| --- | --- |
| | provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ).

ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

On the other hand, the future virtualization of entities (e.g., S-GW, MME, and P-GW) on the core network through a virtual machine (VM) is under discussion. Specifically, there is an ongoing discussion on how to operate a virtual network function (VNF)/service function (SF)—for example, a virtual base station (VBS), S-GW, MME, and P-GW—by running a virtual machine on a hardware resource pool, which is a set of hardware (HW).

Such a network that is defined in software through virtualization is referred to as SDN (software-defined networking). Also, a logical path between virtual network functions (VNF) is referred to as a service function chain (SFC).

By the way, it is important to determine the best SFC for efficient network operation, but no detailed solution to this has been proposed so far.

SUMMARY OF THE INVENTION

Accordingly, one disclosure of the present specification is to propose a solution to the aforementioned problems.

To accomplish the aforementioned object, one disclosure of the present specification provides a method by which a terminal acquires service function chain (SFC) information, the method comprising the steps of: transferring, to a controller, the terminal state information and/or the terminal configuration information; and receiving the SFC information, determined by the controller, by considering the terminal state information and/or the terminal configuration information, wherein the SFC information includes logical path information of a virtualized network function (VNF), the method also including a step for receiving sub-chain information, determined by the controller, on the basis of the SFC information, or determining the sub-chain information on the basis of the SFC information.

The sub-chain information represents a sub-chain between virtualized functions (VF) in the terminal or a sub-chain between other terminals.

The step for determining the sub-chain information includes the steps of: receiving, by the terminal, a sub-chain determination request from the controller; determining the sub-chain based on one or more among the SFC information, information on the terminal and other terminals, and information on the virtualized functions (VF) in the terminal; and transmitting information on the determined sub-chain to the controller.

The received sub-chain information includes information on the sub-chain determined by the controller by considering one or more among the SFC information, information on the terminal and other terminals, and information on the virtualized functions (VF) in the terminal.

The VNF includes a VNF that performs a control plane (CP) function and a VNF that performs a user plane (UP) function that are within a network.

The VNF that performs the CP function is a virtualization of control signal processing and transmission functions of MME (Mobility Management Entity), S-GW (Serving Gateway), and P-GW (Packet Data Network Gateway), and the VNF that performs the UP function is a virtualization of user data processing and transmission functions of S-GW (Serving Gateway) and P-GW (Packet Data Network Gateway).

To accomplish the aforementioned object, one disclosure of the present specification provides a terminal that acquires service function chain (SFC) information, the terminal comprising: a transceiver that transfers, to a controller, the terminal state information and/or the terminal configuration information and receives the SFC information, determined by the controller, by considering the terminal state information and/or the terminal configuration information, wherein the SFC information includes logical path information of a virtualized network function (VNF), and the terminal also includes a processor for receiving sub-chain information, determined by the controller, on the basis of the SFC information, or determining the sub-chain information on the basis of the SFC information.

According to the disclosures of the present specification, the problems occurring in the conventional art will be solved.

DESCRIPTION OF EXEMPLARY EMBODIMENTS

Figure 1:
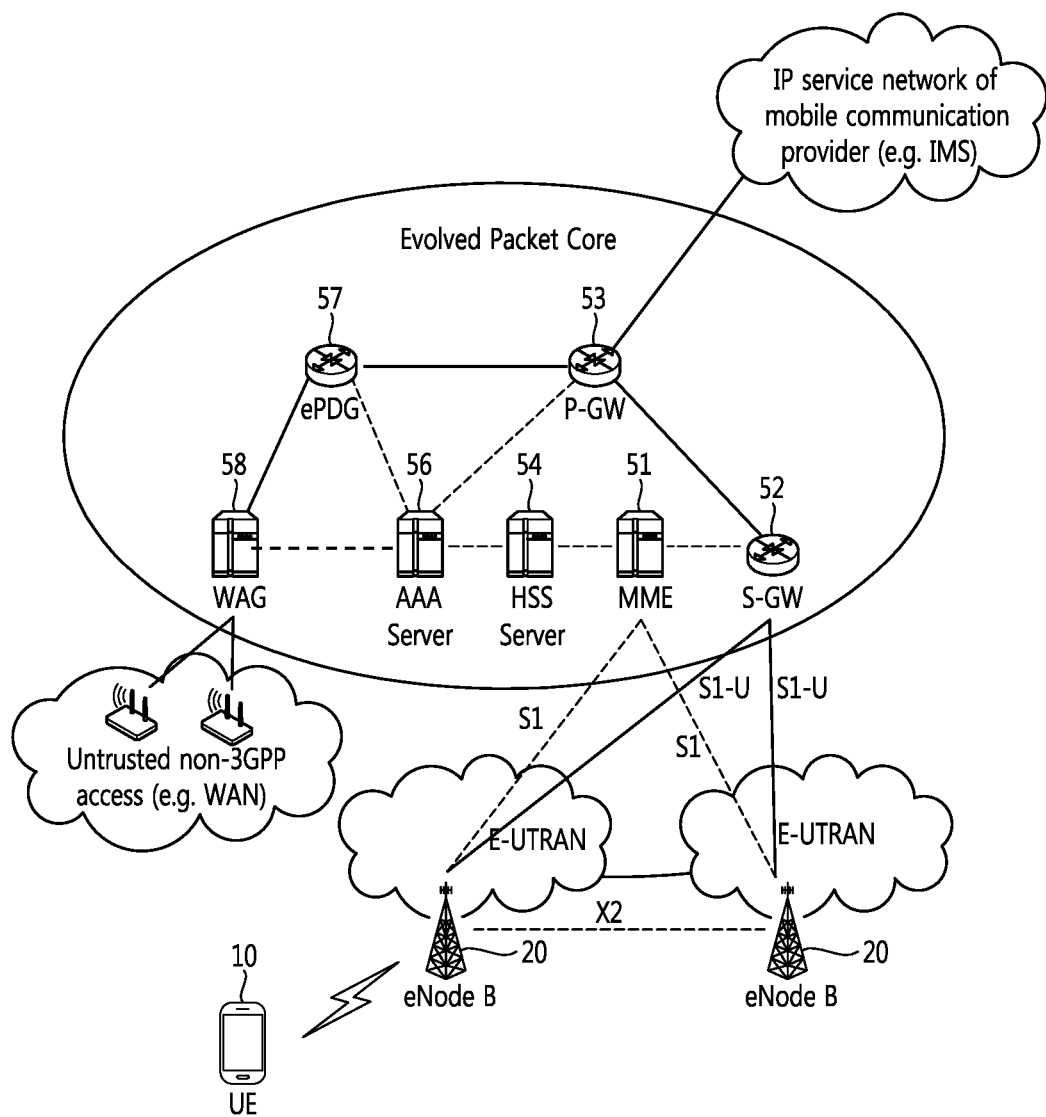
FIG. 1 is a structural diagram of an evolved mobile communication network.
Figure 2:
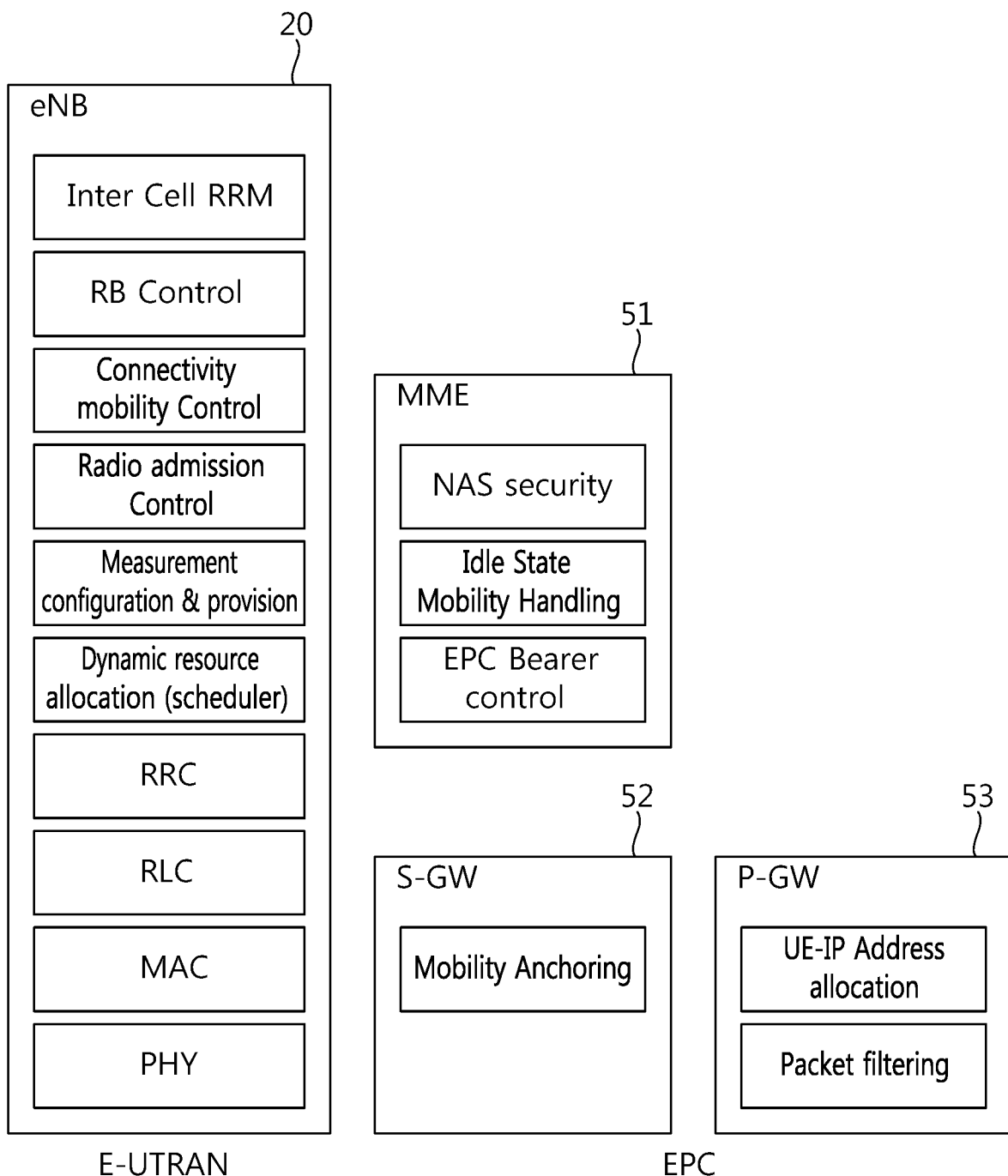
FIG. 2 is an exemplary diagram illustrating architectures of a general E-UTRAN and a general EPC.
Figure 3:
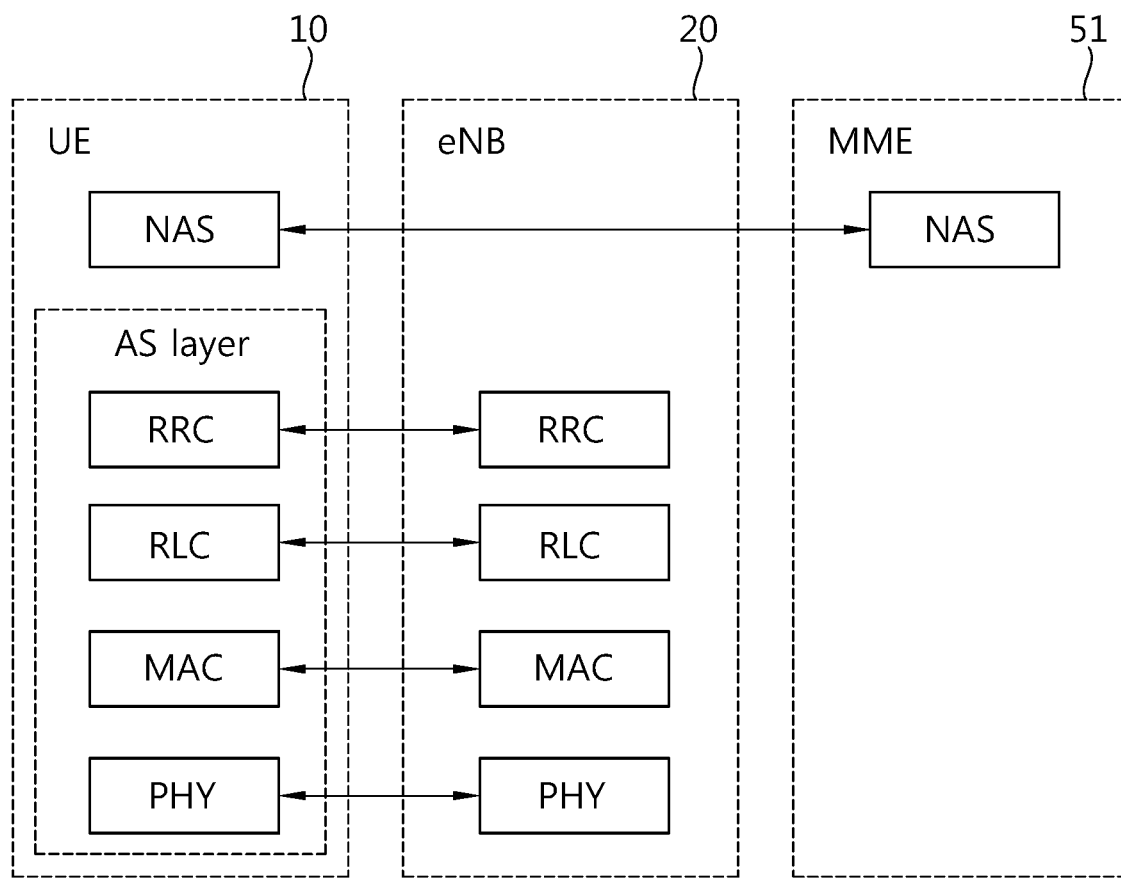
FIG. 3 is an exemplary diagram illustrating a structure of a radio interface protocol on a control plane between UE and eNodeB.
Figure 4:
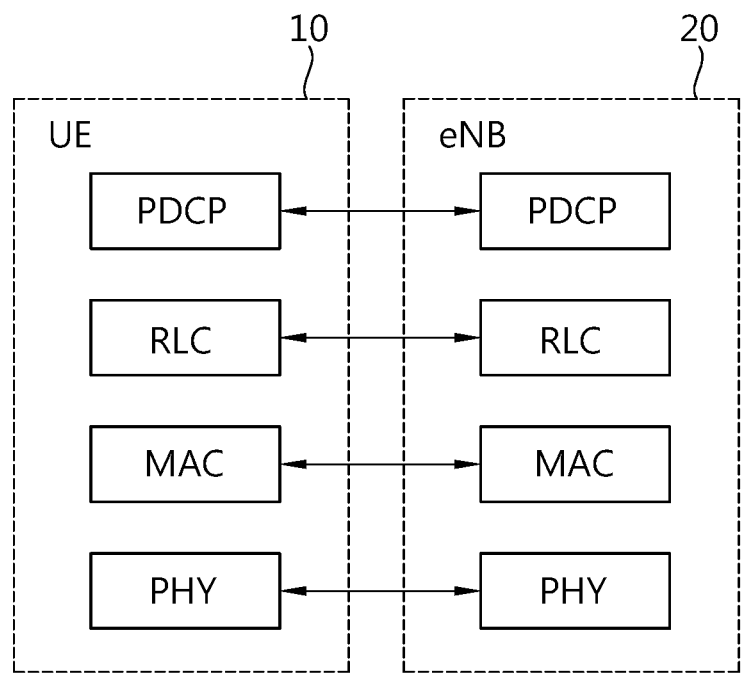
FIG. 4 is another exemplary diagram illustrating a structure of a radio interface protocol on a user plane between the UE and a base station.
Figure 5A:
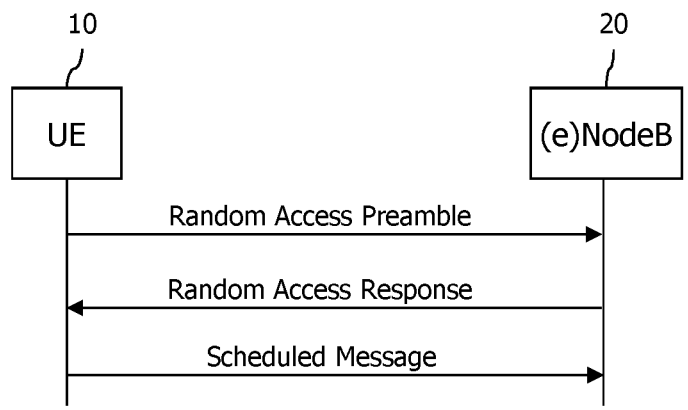
FIG. 5a is a flowchart illustrating a random access process in 3GPP LTE.
Figure 5B:
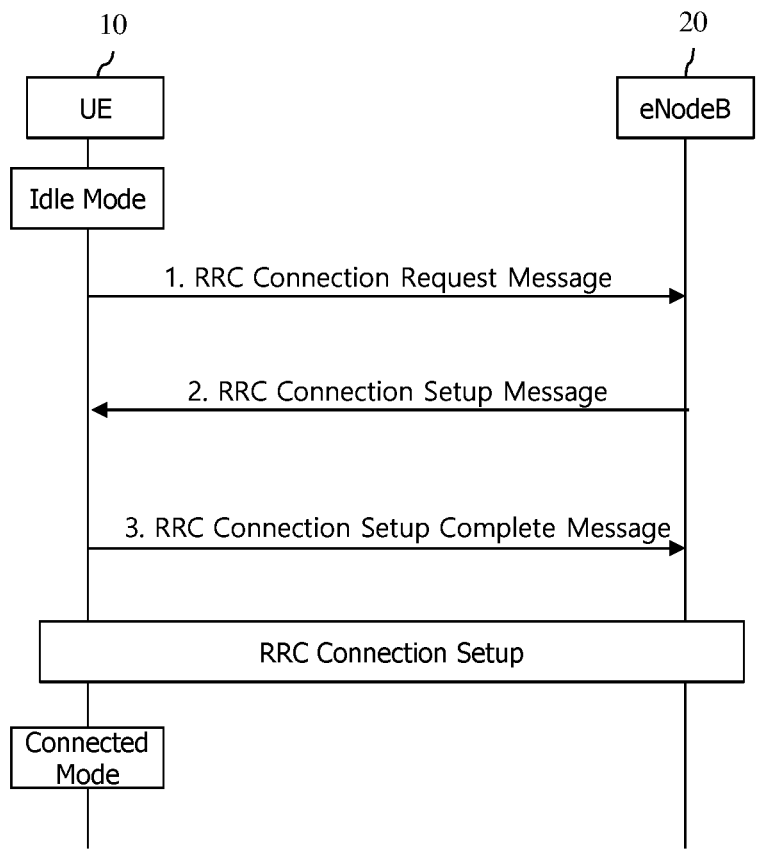
FIG. 5b illustrates a connection process in a radio resource control (RRC) layer.

The presented invention is described in light of UMTS (Universal Mobile Telecommunication System) and the EPC (Evolved Packet Core), but not limited to such communication systems, and may be rather applicable to all communication systems and methods to which the technical spirit of the presented invention may apply.

The technical terms used herein are used to merely describe specific embodiments and should not be construed as limiting the presented invention. Further, the technical terms used herein should be, unless defined otherwise, interpreted as having meanings generally understood by those skilled in the art but not too broadly or too narrowly. Further, the technical terms used herein, which are determined not to exactly represented the spirit of the invention, should be replaced by or understood by such technical terms as being able to be exactly understood by those skilled in the art. Further, the general terms used herein should be interpreted in the context as defined in the dictionary, but not in an excessively narrowed manner.

Furthermore, the expression of the singular number in the specification includes the meaning of the plural number unless the meaning of the singular number is definitely different from that of the plural number in the context. In the following description, the term 'include' or 'have' may represented the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the presented invention.

It will be understood that when an element or layer is referred to as being "connected to" or "coupled to" another element or layer, it can be directly connected or coupled to the other element or layer or intervening elements or layers may be presented. In contrast, when an element is referred to as being "directly connected to" or "directly coupled to" another element or layer, there are no intervening elements or layers presented.

Hereinafter, exemplary embodiments of the presented invention will be described in greater detail with reference to the accompanying drawings. In describing the presented invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smart phone, a multimedia device, or other portable device or may be a stationary device, such as a PC or a car-mounted device.

Definition of Terms

For better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

PLMN: as an abbreviation of Public Land Mobile Network, means a network identification number of a mobile communication provider. In roaming case of the UE, the PLMN is classified into a home PLMN (HPLMN) and a vistied PLMN (VPLMN).

A virtual machine (VM): a virtual computer generated by the virtualization technology.

A virtual network (VN): a virtual network produced by applying the SDN technology to network devices produced by various manufacturers.

Software defined networking (SDN): a scheme responsible for the control plane of all of network devices in a central controller in order to assign programmability to the network devices.

A service function (SF): a component function responsible for network services and processes a single packet or traffic. A corresponding component denotes only a logical entity according to each function, and an instance for an actual operation is mounted and executed in a software-shared network resource or physical-dedicated equipment. One or more instances may be present with respect to one service function.

A virtual network function (VNF): a virtual network function operated in a virtual machine and has a meaning similar to an SF.

A service function chain (SFC): a logical path indicating that a received packet or traffic will be processed by which service function according to which sequence. A service chain is defined according to a network service policy. Each chain is selected depending on a traffic classification function.

A service function path (SFP): denotes an instance of a logically defined service chain. This is a path along which a network packet and traffic is actually delivered as the results of mapping a logical service chain to a service function instance, a physical service node, etc. on an actual network.

ETSI NFV ISG: an abbreviation of European Telecommunications Standards Institute Network Function Virtualization Industry Specification Group.

Network function virtualization (NFV): a scheme in which a network function implemented in hardware in a conventional technology using virtualization technology in servers for common purposes is operating on a virtual machine Network function virtualization infrastructure (NFVI): all of types of infrastructure, such as a processor, memory, a network, and a hypervisor present to provide a virtual machine and a virtual network A network function (NF): denotes equipment responsible for network-related services, for example, an optimizer, a firewall, a network address translator (NAT), and a gateway.

A virtual infrastructure manager (VIM): a management domain that controls and manages the NFVI.

A virtual network function component (VNFC): a network function of a small unit that forms one VNF.

A VNF forwarding graph (VNFFG): the chaining of VNFs configured to provide a general network service. An actual flow passes along a corresponding path. The VNFFG has a meaning similar to the SFC.

<Core Network for Next-Generation Mobile Communication>

Meanwhile, the next-generation mobile communication, so-called 5th-generation mobile communication, is expected to provide data services with a minimum speed of 1 Gbps. Hence, it is expected that mobile communication core networks will have more overload.

Thus, there is an urgent need for the re-design of core networks in the so-called 5th-generation mobile communication.

Figure 6:
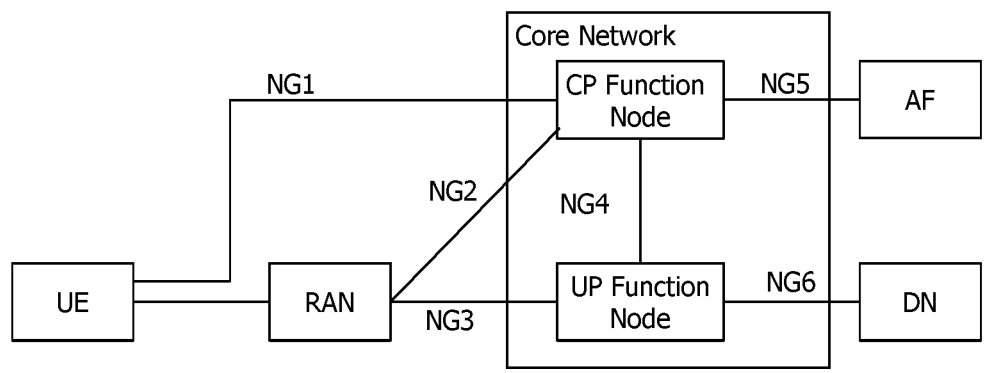
FIG. 6 is an expected structural view of a core network for the next-generation mobile communication.

FIG. 6 is an expected structural view of a core network for the next-generation mobile communication.

As can be seen with reference to FIG. 6, a UE may be connected to a core network over a next-generation RAN (Radio Access Network). The next-generation core network may include a (Control Plane) CP function node and a UP (User Plane) function node. The CP function node is a node that manages UP function nodes and RAN, which sends and receives a control signal. The CP function node performs all or some of the functions of MME of the fourth-generation mobile communication and all or some of the control plane functions of S-GW and P-GW. The UP function node is a type of gateway by which user data is sent and received. The UP function node may perform all or some of the user plane functions of S-GW and P-GW of the fourth-generation mobile communication.

An AF (Application Function) node is an application server that is located within a DN (Data Network).

<Network Virtualization>

Currently, various network functions (NF) such as a core network (e.g., S-GW, MME, and P-GW) and other network entities (e.g., firewall (FW), a load balancer, and an optimizer) are used in network operation.

However, in the next-generation mobile communication, the entities on the core network may be virtualized by a virtual machine (VM).

Figure 7:
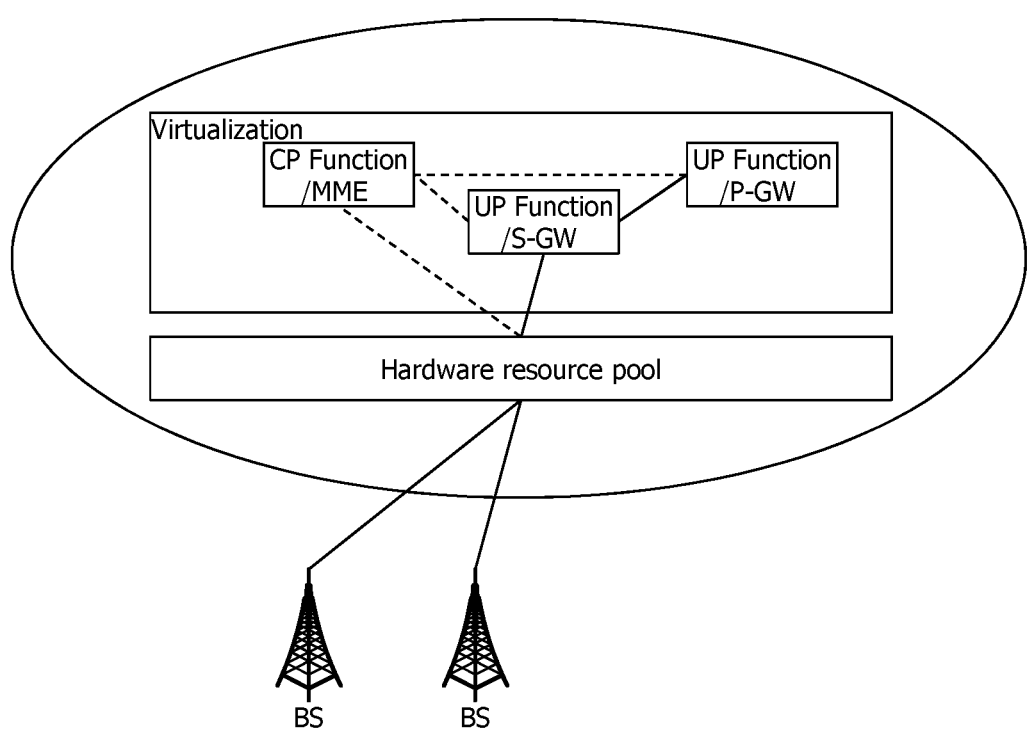
FIG. 7 shows a conceptual example of network virtualization.

FIG. 7 shows a conceptual example of network virtualization.

As shown in FIG. 7, entities (e.g., S-GW, MME, and P-GW) on a core network for the fourth-generation mobile communications or entities (e.g., a CP function and UP functions) on a core network for the fifth-generation mobile communication may be virtualized by a virtual machine (VM). Specifically, a virtual machine may be run on a hardware resource pool, which is a set of hardware (HW), to operate virtual S-GW, MME, and P-GW or virtual CP and UP functions.

Moreover, network entities such as a firewall (FW), a load balancer, and an optimizer may be virtualized by the virtual machine.

Such network virtualization is under discussion in various terms, each of which will be described below.

I. Proposal made by IETF

The IETF (Internet Engineering Task Force) has studied SDN (Software Defined Network) and NFV (Network Function Virtualization) and suggested a service function chain (SFC).

To understand the service function chain (SFC), it is necessary to learn a service function SF. The service function (SF) is a component function that constitutes a network, which processes a single packet or traffic. At this time, the corresponding component only refers to a logical entity for each function, and an instance for actual operation is onboarded and executed on a hardware resource shared by software, and one or more instances may exist for a single service function. Therefore, the service function chain (SFC) is an ordered set of service functions (SF) required for a particular service. That is, the service function chain (SFC) is a logical path that indicates which service function (SF) processes a received packet or traffic in which sequence.

Meanwhile, a service node (SN) is an element entity that is connected to the network, where one or more service function instances are onboarded and executed. A service function receives traffic from the network via a corresponding node and sends processed traffic to the network.

II. Proposal made by ETSI NFV ISG

NFV ISG of ETSI (European Telecommunications Standards Institute) proposes a network function virtual (NFV) to provide a flexible and fast network service.

Figure 8:
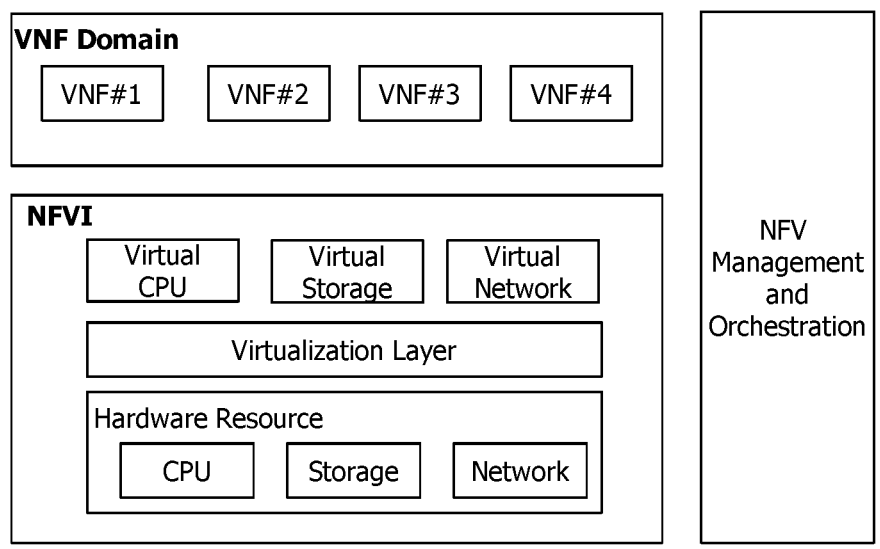
FIG. 8 shows an example of an NFV framework proposed by ETSI NFV ISG.

FIG. 8 shows an example of an NFV framework proposed by ETSI NFV ISG.

Referring to FIG. 8, an NFV framework includes a network function virtual infrastructure (NFVI), a VNF domain, and NVF management and orchestration. The NFVI includes various physical hardware resources (e.g., a CPU, storage, and a network) and a virtualization layer for virtualizing the hardware resources. The NFVI includes virtualized hardware resources (that is, a virtual CPU, virtual storage, and a virtual network).

The VNF domain includes a plurality of virtualized network functions (VNF).

<Introduction of Virtualization in Next-Generation Mobile Communication>

In 3GPP-based next-generation mobile communication, so-called fifth-generation mobile communication, a UP function node and CP function node within a core network are expected to be virtualized.

Figure 9:
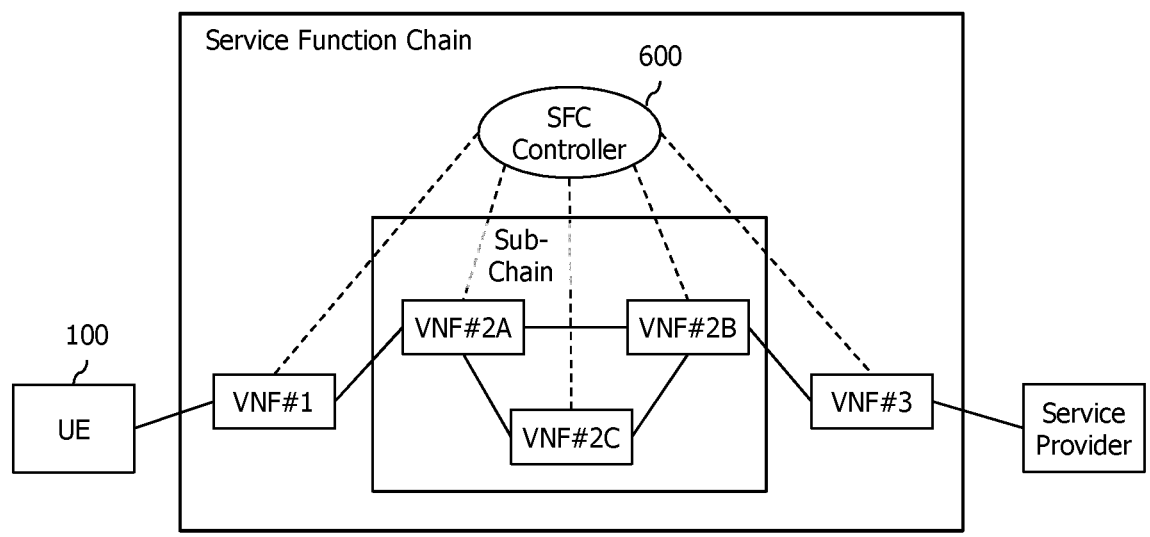
FIG. 9 is an illustration of a service function chain (SFC) according to virtualization of the next-generation mobile communication.

FIG. 9 is an illustration of a service function chain (SFC) according to virtualization of the next-generation mobile communication.

As can be seen with reference to FIG. 9, a service function chain (SFC) in which VNFs are defined in a meaningful sequence may be formed to send data of a user plane UP or send a signal of a control plane CP.

The SFC controller (or SDN controller) 600 shown in the drawing may selectively control each VNF, and check and control each VNF's state and the network state. The SFC controller may determine the meaningful sequence of the service chain, based on each VNF's state and the network state.

<Objective Pursued by the Disclosure of the Present Specification>

In the aforementioned SDN/NFV, a service function chain (SFC) is determined by dynamically taking the state of each service function (SF)/virtualized network functions (VNF) into consideration, in order to carry user plane data. However, the UE (or terminal)'s environment or state was not taken into consideration, even though the UE (or terminal) is an entity that receives service. Particularly, 5G network environments are evolving towards satisfying various service requirements of the UE (or terminal), so there is a need to take the UE (or terminal)'s environment or state into consideration.

Accordingly, an objective of the disclosure of the present specification is to propose a method of determining a service function chain (SFC) by taking the UE (or terminal)'s environment or state into consideration.

Disclosure of the Present Specification

According to the disclosure of the present specification, there is provided a method that manages and controls a UE (or terminal) in the same manner as VNF when determining a service function chain (SFC).

Figure 10:
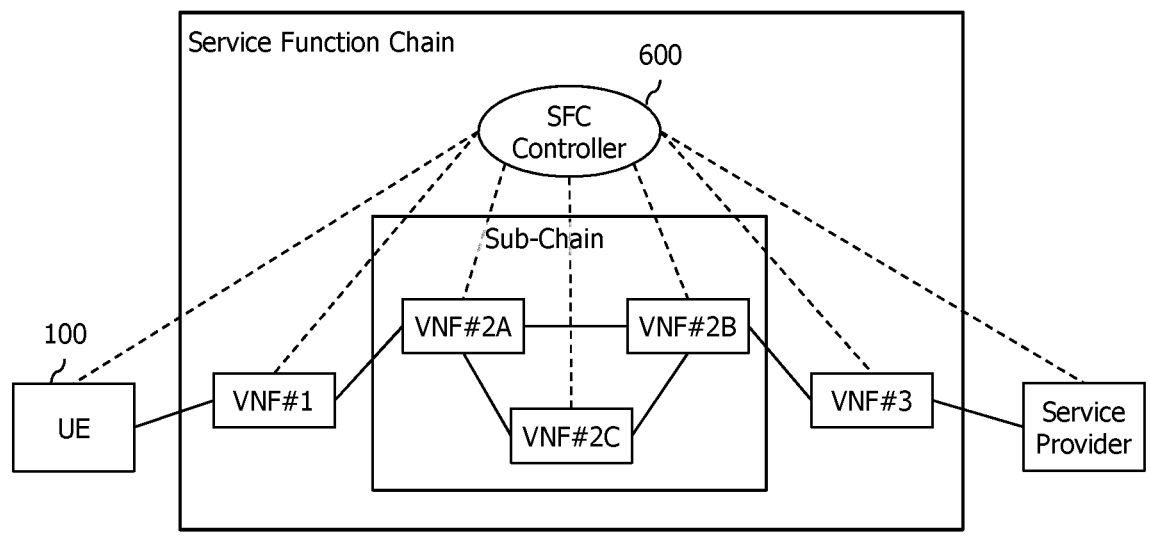
FIG. 10 shows an example in which a UE is considered/managed when determining a service function chain (SFC) according to one disclosure of the present specification.

FIG. 10 shows an example in which a UE is considered/managed when determining a service function chain (SFC) according to one disclosure of the present specification.

Referring to FIG. 10, unlike FIG. 9, a UE 100 and an SFC controller 600 are connected by a dotted line. The dotted line indicates that the SFC controller 600 considers and manages the UE (or terminal) 100 when determining a service function chain (SFC). By considering the UE (or terminal) 100, efficiency can be achieved in the following examples.

For instance, let's assume a scenario where a user with a UE gets on a train or the UE is mounted within the train. In this case, the UE has information on instantaneous speed and directionality. Such information may serve as important information when determining the location of a mobile anchor or whether to reselect the mobile anchor or not. Accordingly, the SFC controller will take the aforementioned information of the UE (or terminal) into consideration when determining a service function chain (SFC).

In another example, configuration information of a single UE may vary depending on the possibility of cooperative communication with a number of sensors around the UE or other terminals. In an e-health scenario, monitors, sensors, etc. capable of direct/indirect communication (e.g., D2D (device-to-device) communication) with neighboring UEs may depend on whether the UE is at home or in a hospital. Thus, the UE may provide the SFC controller with configuration information on its surroundings in a particular environment at a particular time, and the SFC controller may determine which codec is suitable for each UE's monitor and sensor or whether to employ a security module or not, when determining a service function chain (SFC).

As another example of cooperative communication between UEs, an e-class scenario for an educational institution such as a school may be taken into consideration. The performance, screen size, etc. of a teacher's monitor and device may be different from the performances, screen sizes, etc. of students' UEs. Accordingly, configuration information on the surroundings may be provided to the controller under an environment premised on dynamical interactions between UEs, and the SFC controller may determine a proper service function chain (SFC). Particularly, as long as a security scheme based on biological information such as fingerprints, iris scans, etc. is used, the SFC controller may determine a codec suitable for each sensor and determine whether to employ a security module or not.

As yet another example of cooperative communication, a V2X scenario for cooperation between a number of sensors and a UE within a vehicle may be taken into consideration. Specifically, let's assume a scenario where a UE a user in a vehicle carries communicates with a sensor, a screen monitor, etc. in the vehicle and therefore provides an infotainment service. In this scenario, when configuration information on the surroundings which vary with dynamical environment and time is provided, the SFC controller may determine a proper service function chain (SFC). In this case, too, as long as a security scheme based on biological information such as fingerprints, iris scans, etc. is used, the SFC controller may determine a codec suitable for each sensor and determine whether to employ a security module or not.

In the above, the information the UE provides to the SFC controller may be provided to the network as direct values— that is, absolute values of speed, direction, sensor name, and sensor capability. Alternatively, the information the UE provides to the SFC controller may be provided as an implicative value, based on predefined configuration information. For example, for an up-train travelling at 100 km/hour or higher, the UE may provide a value of 01 as speed information and a value of 11 as direction information, depending on predefined configuration information and format.

Alternatively, in a case where information can be grouped by a combination of various configurations, grouped information may be provided as a meaningful value. For example, for an up-train travelling at 100 km/hour or higher, information is grouped according to a combination of configurations, allowing the UE to provide a value 1. Moreover, for a sensor capable of measuring body temperature and heartbeat, information is grouped according to a combination of configurations, allowing the UE to provide a value 2.

Figure 11:
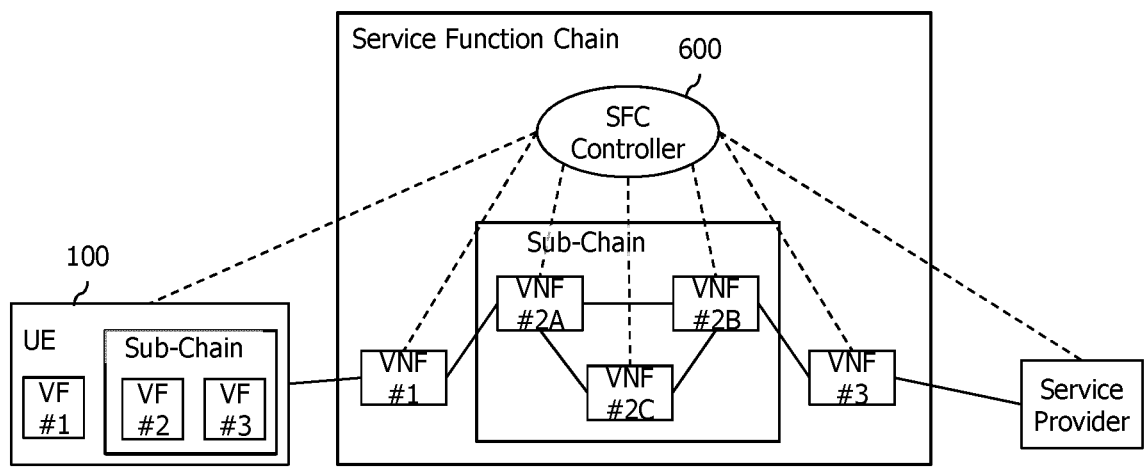
FIG. 11 shows an example in which virtual functions (VF) within a UE are considered/managed when determining a service function chain (SFC) according to another disclosure of the present specification.

FIG. 11 shows an example in which virtual functions (VF) within a UE are considered/managed when determining a service function chain (SFC) according to another disclosure of the present specification.

As can be seen with reference to FIG. 11, virtual functions (VF) may exist within a UE 100, and some of the virtual functions (VF) may constitute a sub-chain, like a network. For example, it may not be necessary for a 5G mobile communication system to perform UE IP address allocation or user plane session management. That is, the UE may be non-IP, and the UE is expected to be capable of data transmission through the control plane. Thus, the UE may require IP address management or not depending on the service it uses, and functions for IP address management may be included in the service function chain (SFC) or not. The UE may determine internally required virtual functions (VF) (to this end, the UE may internally have a control function), and or may determine the service function chain (SFC) via communication with the SFC controller 600. Moreover, particular information from each module may be provided to the network and taken into consideration when determining the service function chain (SFC).

Figure 12:
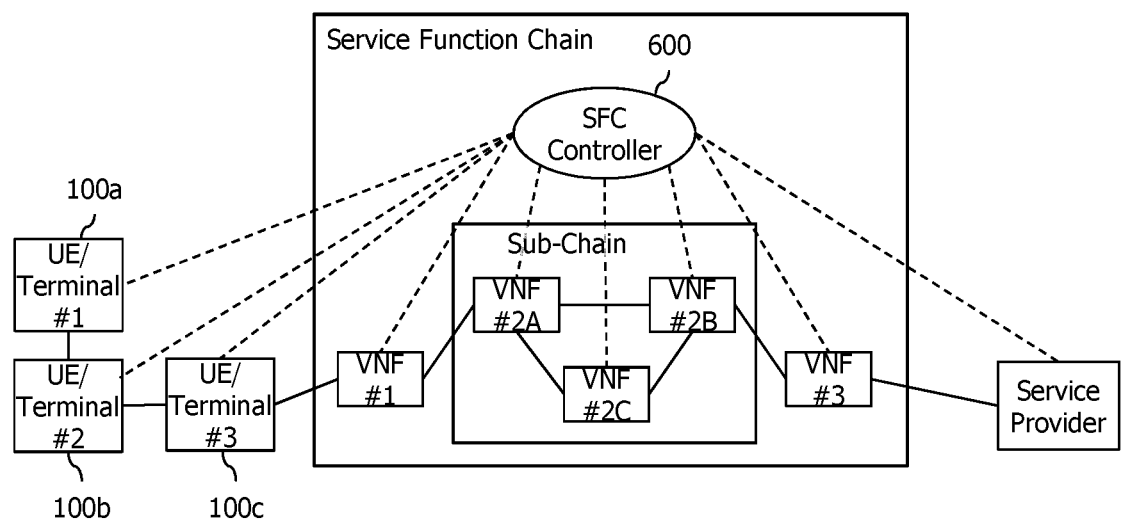
FIG. 12 shows an example in which a number of UEs are considered/managed when determining a service function chain (SFC) according to yet another disclosure of the present specification.

FIG. 12 shows an example in which a number of UEs are considered/managed when determining a service function chain (SFC) according to yet another disclosure of the present specification.

As shown in FIG. 12, when UEs perform cooperative communication using communication technologies such as D2D, WLAN, and Bluetooth, the SFC controller may determine the service function chain (SFC) by taking such cooperative communication into consideration. Each terminal may be a device such as a sensor or monitor that cannot be connected directly to the SFC controller, i.e., that is incapable of wireless communication with a mobile communication core network. In this case, all the UEs may be connected to the SFC controller, or a representative UE alone may be connected to the SFC controller.

The SFC controller may view each terminal as a virtual function (VF) and take this into consideration when determining the entire service function chain (SFC).

Figure 13:
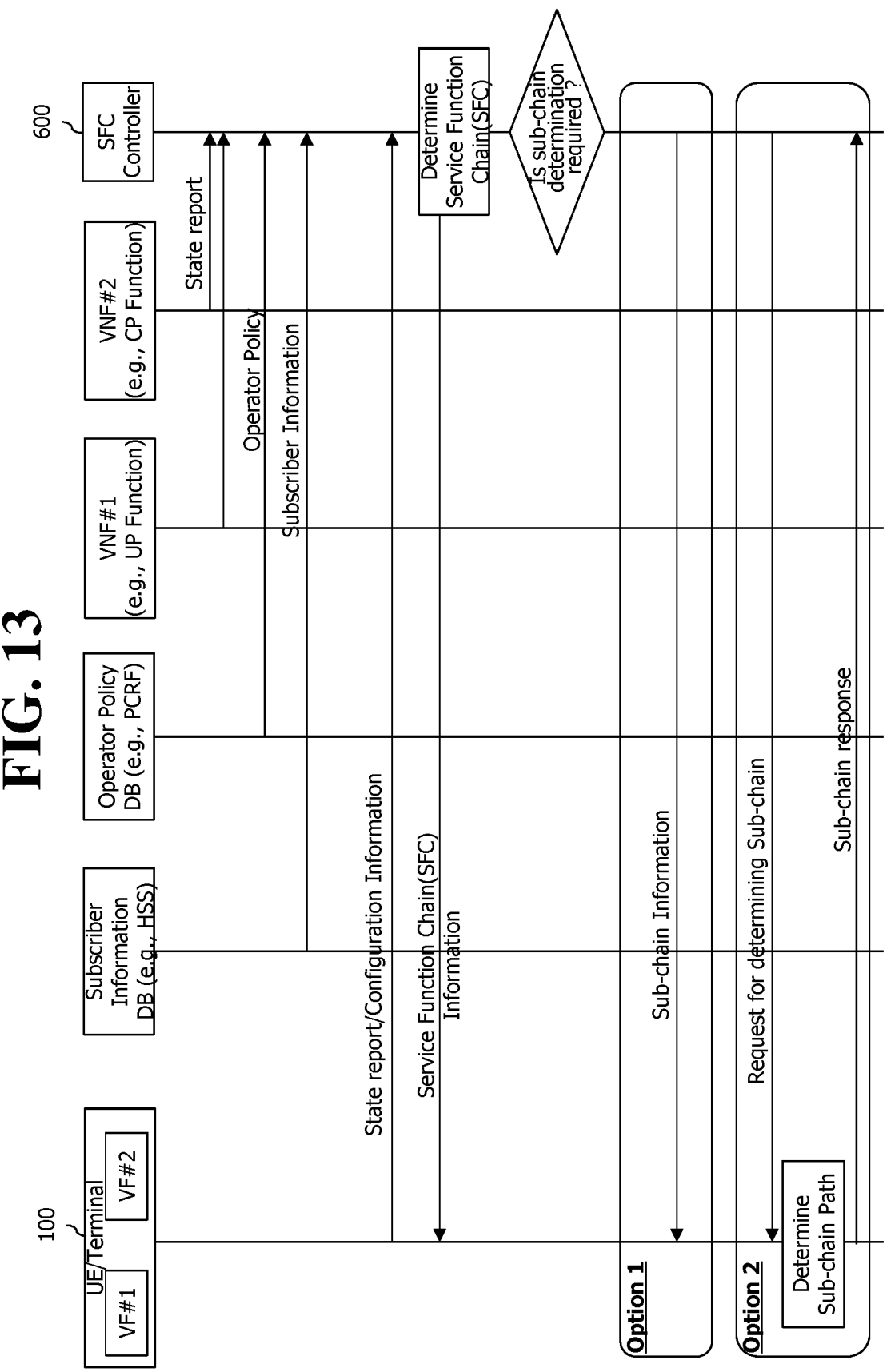
FIG. 13 shows a process of determining a service function chain (SFC) by taking UE/terminal state information into consideration, in the example shown in FIG. 11.

FIG. 13 shows a process of determining a service function chain (SFC) by taking UE/terminal state information into consideration, in the example shown in FIG. 11.

First, VNF #1 (e.g., UP function) and VNF #2 (e.g., CP function) may transmit their state information and network environment information to the SFC controller 600 periodically or when an event occurs. A business operator policy database (DB) (e.g., PCRF) transmits an operator policy (e.g., a business operator policy on session management) to the SFC controller 600 periodically or when an event occurs. A subscriber information DB (e.g., HSS) transmits subscriber information to the SFC controller 600 periodically or when an event occurs.

Meanwhile, the UE/terminal 100 transmits state information (e.g., load information, capacity information, etc.) and configuration information (e.g., available sensor information, software type information, and activation information) of internal VFs to the SFC controller 600 periodically or when an additional event occurs. In this case, the UE/terminal 100 may aggregate information from the internal VFs and then send it, or each VF may send its information to the SFC controller 600. When the UE/terminal 100 aggregates and sends the information, the UE/terminal 100 may process/select the information and then send it.

Then, the SFC controller 600 determines a service function chain (SFC) and information the UE/terminal 100 about this. Alternatively, the SFC controller 600 may transmit information on the service function chain (SFC) to a representative VF in the UE/terminal 100. Then, the representative VF in the UE/terminal 100 may transmit it to other VFs.

Meanwhile, the SFC controller 600 may perform the determination and update of a sub-chain between the internal VFs, as well as the determination and update of the service function chain (SFC). That is, the SFC controller 600 may assume that the sub-chain between the internal VFs in the UE/terminal 100, too, is part of the service function chain (SFC). In this case, the SFC controller 600 may determine the sub-chain within a range that the business operator policy and the subscriber policy permit. Particularly, the sub-chain is determined to reduce delay or increase the availability of network resources, by considering the possibility of resource utilization.

According to Option 1 shown in the drawing, the SFC controller 600 may determine the sub-chain and then inform the UE/terminal 100 about this. Alternatively, the SFC controller 600 may transmit information on the sub-chain to each VF in the UE/terminal 100.

According to Option 2 shown in the drawing, the SFC controller 600 may decide that there is a need to determine a sub-chain, and actually entrust/request the UE/terminal 100 with/for the sub-chain. The SFC controller 600 normally performs central control, but, if the network range is wide, manage the sub-chain through distributed control, thereby ensuring the independence of the sub-chain and improving flexibility and efficiency. That is, the UE/terminal 100 may determine the sub-chain based on one or both of the received service function chain (SFC) information and its VF information and transmit information on the determined sub-chain to the SFC controller 600. Alternatively, the representative VF, among the VFs in the UE/terminal 100, may determine a sub-chain and transmit information on the sub-chain to other VFs and the SFC controller 600.

In a case where the sub-chain information is determined and then transmitted to the SFC controller 600 by the UE/terminal 100 or the representative VF in the UE/terminal 100, the sub-chain information may act as another factor that alters the entire service function chain (SFC).

If the configuration information of the UE/terminal 100 is frequently changed but not transmitted to the SFC controller 600 in real time, Option 2 may be more useful than Option 1.

While the above description has been given with respect to a sub-chain between VFs in the UE/terminal 100, the description may also apply to a sub-chain in some part of the network.

Figure 14:
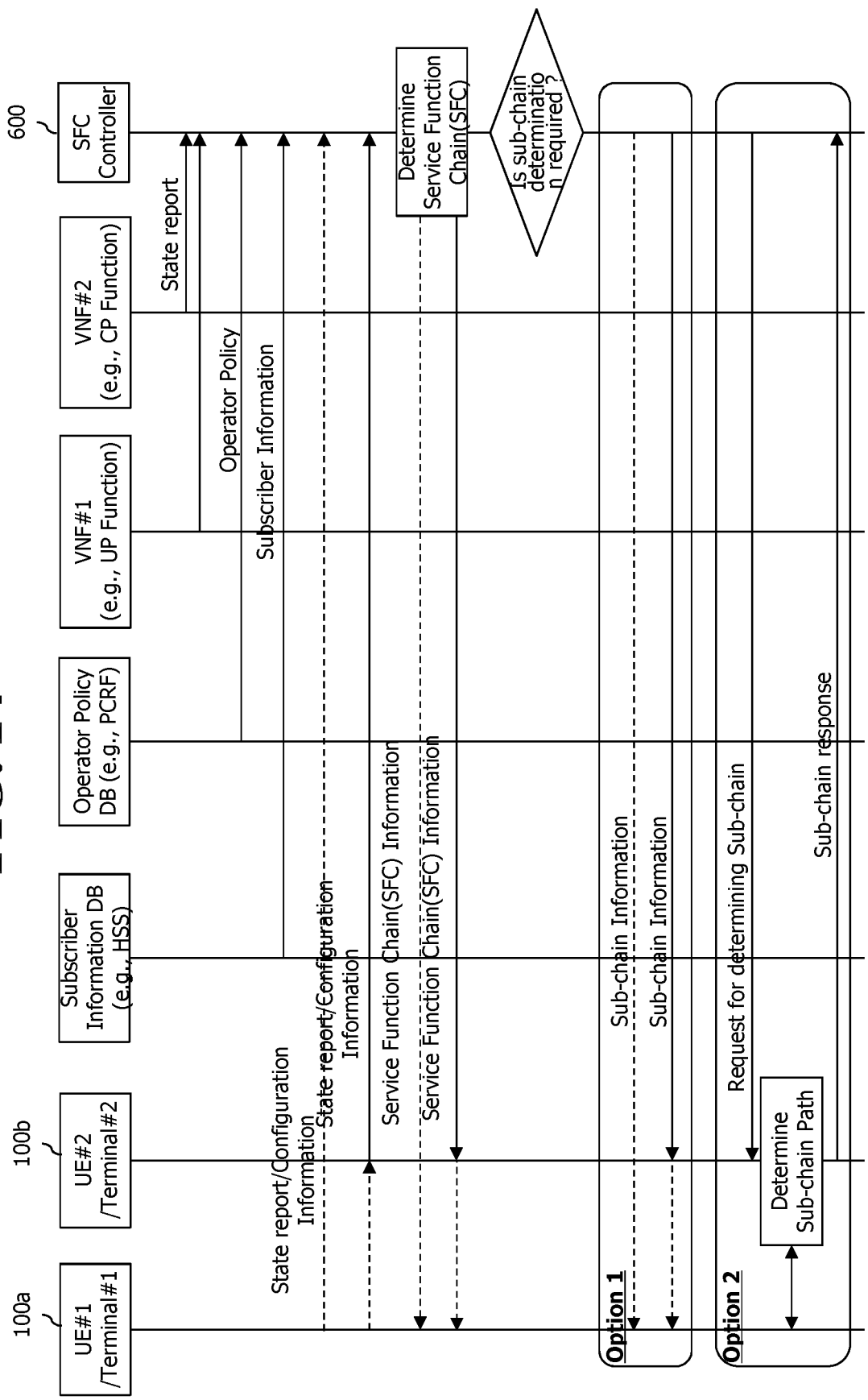
FIG. 14 shows a process of determining a service function chain (SFC) by taking UE/terminal state information into consideration, in the example shown in FIG. 12.

FIG. 14 shows a process of determining a service function chain (SFC) by taking UE/terminal state information into consideration, in the example shown in FIG. 12.

Like what has been explained with reference to FIG. 13, VNF #1 (e.g., UP function) and VNF #2 (e.g., CP function) may transmit their state information and network environment information to the SFC controller 600 periodically or when an event occurs. A business operator policy database (DB) (e.g., PCRF) transmits an operator policy (e.g., a business operator policy on session management) to the SFC controller 600 periodically or when an event occurs. A subscriber information DB (e.g., HSS) transmits subscriber information to the SFC controller 600 periodically or when an event occurs.

Meanwhile, the UEs/terminals 100*a* and 100*b* transmit their state information (e.g., load information, capacity information, etc.) and configuration information (e.g., available sensor information, software type information, and activation information) of internal VFs to the SFC controller 600 periodically or when an additional event occurs. In this case, the UEs/terminals 100*a* and 100*b* each may send their own information to the SFC controller, or the representative UE/terminal 100*b* may aggregate and send the information. When the representative UE/terminal 100*b* aggregates and sends the information, the representative UE/terminal 100*b* may process/select the information and then send it.

Then, the SFC controller 600 determines a service function chain (SFC) and information the UEs/terminals 100*a* and 100*b* about this. Alternatively, the SFC controller 600 may transmit information on the service function chain (SFC) to the representative UE/terminal 100*b*. In this case, the representative UE/terminal 100*b* may transmit the information on the service function chain (SFC) to the other UE/terminal 100*a*.

Meanwhile, the SFC controller 600 may perform the determination and update of a sub-chain between the UEs/terminals 100*a* and 100*b*, as well as the determination and update of the service function chain (SFC). That is, the SFC controller 600 may assume that the sub-chain between the UEs/terminals 100*a* and 100*b*, too, is part of the service function chain (SFC). In this case, the SFC controller 600 may determine the sub-chain within a range that the business operator policy and the subscriber policy permit. Particularly, the sub-chain is determined to reduce delay or increase the availability of network resources, by considering the possibility of resource utilization.

According to Option 1 shown in the drawing, the SFC controller 600 may determine the sub-chain between the UEs/terminals 100*a* and 100*b* and then inform the UEs/terminals 100*a* and 100*b* about this. Alternatively, the SFC controller 600 may transmit information on the sub-chain to the representative UE/terminal 100*b*. Then, the representative UE/terminal 100*b* may transmit this to the other UE/terminal 100*a*

According to Option 2 shown in the drawing, the SFC controller 600 may decide that there is a need to determine a sub-chain, and actually entrust/request the representative UE/terminal 100*b* with/for the sub-chain. The SFC controller 600 normally performs central control, but, if the network range is wide, manage the sub-chain through distributed control, thereby ensuring the independence of the sub-chain and improving flexibility and efficiency. That is, the representative UE/terminal 100*b* may determine the sub-chain based on one or both of the received service function chain (SFC) information and the information on the other UE/terminal 100*a* and transmit information on the determined sub-chain to the SFC controller 600 and the other UE/terminal 100*a*.

In a case where the sub-chain information is determined and then transmitted to the SFC controller 600 by the representative UE/terminal 100*b*, the sub-chain information may act as another factor that alters the entire service function chain (SFC).

While the above description has been given with respect to a sub-chain between the UEs/terminals 100*a* and 100*b*, the description may also apply to a sub-chain in some part of the network.

What has been described so far may be implemented by hardware. This will be explained with reference to FIG. 15.

Figure 15:
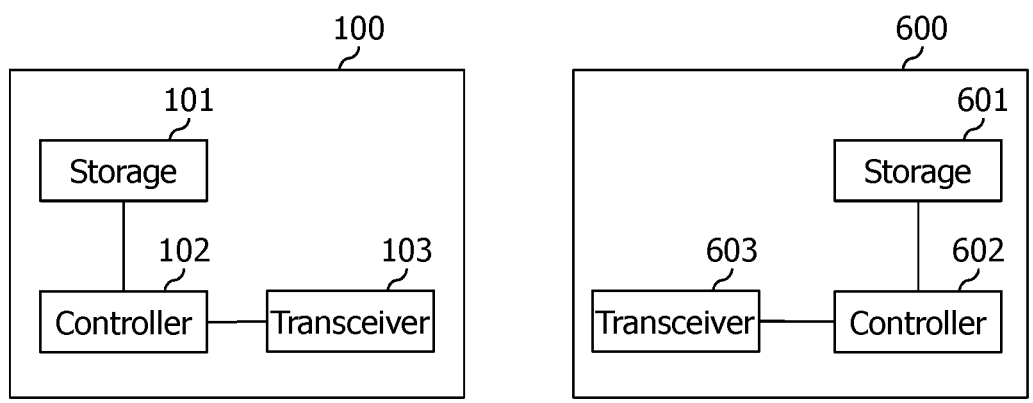
FIG. 15 is a block diagram of the components of a UE 100 and network node according to an embodiment of the present invention.

FIG. 15 is a block diagram of the components of a UE 100 and network node according to an embodiment of the present invention.

As shown in FIG. 18, the UE 100 includes a storage means 101, a controller 102, and a transceiver 103. The network node may be the SFC controller 600. The network node includes a storage means 601, a controller 602, and a transceiver 603.

The storage means store the above-described method.

The controllers control the storage means and the transceivers. Specifically, the controllers respectively execute the methods stored in the storage means. The controllers send the above-described signals through the transceivers.

Although preferred embodiments of the present invention have been illustratively described, the scope of the present invention is not limited to only the specific embodiments, and the present invention may be modified, changed, or improved in various forms within the spirit of the present invention and a category written in the claims.

What is claimed is:

1. A method by which a terminal acquires service function chain (SFC) information, the method comprising steps of:
    transferring, to a controller, terminal state information and/or terminal configuration information; and
    receiving SFC information, determined by the controller, by considering the terminal state information and/or the terminal configuration information,
    wherein the SFC information includes logical path information of a virtualized network function (VNF),
    the method also including a step for receiving sub-chain information, determined by the controller, based on the SFC information, or determining the sub-chain information based on the SFC information.

2. The method of claim 1, wherein the VNF includes a VNF that performs a control plane (CP) function and a VNF that performs a user plane (UP) function that are within a network.

3. The method of claim 2, wherein the VNF that performs the CP function is a virtualization of control signal processing and transmission functions of MME (Mobility Management Entity), S-GW (Serving Gateway), and P-GW (Packet Data Network Gateway), and the VNF that performs the UP function is a virtualization of user data processing and transmission functions of S-GW (Serving Gateway) and P-GW (Packet Data Network Gateway).

4. The method of claim 1, wherein the sub-chain information represents a sub-chain between virtualized functions (VF) in the terminal or a sub-chain between other terminals.

5. The method of claim 1, wherein the step for determining the sub-chain information includes steps of:
    receiving, by the terminal, a sub-chain determination request from the controller;
    determining a sub-chain based on one or more among the SFC information, information on the terminal and other terminals, and information on virtualized functions (VF) in the terminal; and
    transmitting information on the determined sub-chain to the controller.

6. The method of claim 1, wherein the received sub-chain information includes information on a sub-chain determined by the controller by considering one or more among the SFC information, information on the terminal and other terminals, and information on virtualized functions (VF) in the terminal.

7. A terminal that acquires service function chain (SFC) information, the terminal comprising:
    a transceiver that transfers, to a controller, terminal state information and/or terminal configuration information and receives SFC information, determined by the controller, by considering the terminal state information and/or the terminal configuration information,
    wherein the SFC information includes logical path information of a virtualized network function (VNF),
    the terminal also including a processor for receiving sub-chain information, determined by the controller, based on the SFC information, or determining the sub-chain information based on the SFC information.

8. The terminal of claim 7, wherein the VNF includes a VNF that performs a control plane (CP) function and a VNF that performs a user plane (UP) function that are within a network.

9. The terminal of claim 8, wherein the VNF that performs the CP function is a virtualization of control signal processing and transmission functions of MME (Mobility Management Entity), S-GW (Serving Gateway), and P-GW (Packet Data Network Gateway), and the VNF that performs the UP function is a virtualization of user data processing and transmission functions of S-GW (Serving Gateway) and P-GW (Packet Data Network Gateway).

10. The terminal of claim 7, wherein the sub-chain information represents a sub-chain between virtualized functions (VF) in the terminal or a sub-chain between other terminals.

11. The terminal of claim 7, wherein the determination of the sub-chain information by the processor includes:
    receiving a sub-chain determination request from the controller through the transceiver;
    determining a sub-chain based on one or more among the SFC information, information on the terminal and other terminals, and information on the virtualized functions (VF) in the terminal; and
    transmitting information on the determined sub-chain to the controller through the transceiver.

12. The terminal of claim 7, wherein the received sub-chain information includes information on a sub-chain determined by the controller by considering one or more among the SFC information, information on the terminal and other terminals, and information on virtualized functions (VF) in the terminal.

* * * * *